United States Patent
Parker

(10) Patent No.: US 7,475,540 B2
(45) Date of Patent: Jan. 13, 2009

(54) VARIABLE GEOMETRY TURBINE

(75) Inventor: John Parker, Huddersfield (GB)

(73) Assignee: Holset Engineering Co., Limited, Huddersfield (GB)

( * ) Notice: Subject to any disclaimer, the term of this patent is extended or adjusted under 35 U.S.C. 154(b) by 447 days.

(21) Appl. No.: 11/195,000

(22) Filed: Aug. 2, 2005

(65) Prior Publication Data

US 2005/0262841 A1 Dec. 1, 2005

Related U.S. Application Data

(63) Continuation of application No. 10/717,232, filed on Nov. 19, 2003, now Pat. No. 6,931,849, which is a continuation-in-part of application No. 10/659,857, filed on Sep. 11, 2003, now abandoned.

(30) Foreign Application Priority Data

Nov. 19, 2002 (GB) .................................. 0226943.9

(51) Int. Cl.
*F02D 23/00* (2006.01)
(52) U.S. Cl. ......................... 60/602; 415/145; 415/157
(58) Field of Classification Search .................. 60/602; 415/145, 157, 158
See application file for complete search history.

(56) References Cited

U.S. PATENT DOCUMENTS

| | | | |
|---|---|---|---|
| 3,478,955 A | 11/1969 | Kunderman | |
| 4,499,731 A | 2/1985 | Moser | |
| 5,044,880 A | 9/1991 | McKean | |
| 5,146,752 A * | 9/1992 | Bruestle | 60/602 |
| 5,522,697 A | 6/1996 | Parker et al. | |
| 5,941,684 A | 8/1999 | Parker | |
| 6,203,272 B1 | 3/2001 | Walsham | |
| 7,150,151 B2 * | 12/2006 | Mulloy et al. | 60/602 |
| 7,207,176 B2 * | 4/2007 | Mulloy et al. | 60/602 |
| 2006/0010864 A1 * | 1/2006 | Mulloy et al. | 60/602 |
| 2007/0283693 A1 * | 12/2007 | Mulloy et al. | 60/598 |

FOREIGN PATENT DOCUMENTS

| | | |
|---|---|---|
| EP | 0654587 | 5/1995 |
| EP | 2320294 | 6/1998 |
| EP | 0884454 | 12/1998 |
| EP | 1260676 | 11/2002 |

* cited by examiner

*Primary Examiner*—Hoang M Nguyen
(74) *Attorney, Agent, or Firm*—Krieg DeVault LLP; J. Bruce Schelkopf, Esq.

(57) ABSTRACT

A variable geometry turbine has an annular inlet passageway defined between a radial wall of a moveable wall member and a facing wall of the turbine housing. The moveable wall member is mounted within an annular cavity provided within the housing and having inner and outer annular surfaces. An annular seal is disposed between an annular flange of the moveable wall member and the adjacent inner or outer annular surface of the cavity. One or more inlet bypass passages are provided in the annular flange or said adjacent cavity surface, such that the annular seal and bypass passageways move axially relative to one another as the moveable wall member moves. The annular seal and the or each bypass passage are axially located such as the annular wall member approaches the facing wall of the housing the or each bypass passage permits the flow of exhaust gas through said cavity to the turbine wheel thereby bypassing the annular inlet passageway.

21 Claims, 4 Drawing Sheets

VARIABLE GEOMETRY TURBINE

The present application is a continuation of U.S. patent application Ser. No. 10/717,232 filed Nov. 19, 2003, now U.S. Pat. No. 6,931,849, which is a continuation-in-part of U.S. patent application Ser. No. 10/659,857 filed Sep. 11, 2003, now abandoned, which claim priority to British Patent Application No. 0226943.9 filed Nov. 19, 2002, each of which is incorporated herein by reference.

The present invention relates to a variable geometry turbine. Particularly, but not exclusively, the invention relates to the turbine of a turbocharger for an internal combustion engine. More particularly still, the invention relates to vehicle engine turbochargers which may be controlled to operate as an engine exhaust brake.

Turbochargers are well known devices for supplying air to the intake of an internal combustion engine at pressures above atmospheric (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the engine intake manifold. The turbocharger shaft is conventionally supported by journal and thrust bearings, including appropriate lubricating systems, located within a central bearing housing connected between the turbine and compressor wheel housings.

In known turbochargers, the turbine stage comprises a turbine chamber within which the turbine wheel is mounted, an annular inlet passageway defined between facing radial walls arranged around the turbine chamber, an inlet arranged around the inlet passageway, and an outlet passageway extending from the turbine chamber. The passageways and chambers communicate such that pressurised exhaust gas admitted to the inlet chamber flows through the inlet passageway to the outlet passageway via the turbine and rotates the turbine wheel. It is also well known to trim turbine performance by providing vanes, referred to as nozzle vanes, in the inlet passageway so as to deflect gas flowing through the inlet passageway towards the direction of rotation of the turbine wheel.

Turbines may be of a fixed or variable geometry type. Variable geometry turbines differ from fixed geometry turbines in that the size of the inlet passageway can be varied to optimise gas flow velocities over a range of mass flow rates so that the power output of the turbine can be varied to suit varying engine demands. For instance, when the volume of exhaust gas being delivered to the turbine is relatively low, the velocity of the gas reaching the turbine wheel is maintained at a level which ensures efficient turbine operation by reducing the size of the annular inlet passageway.

In one known type of variable geometry turbine, one wall of the inlet passageway is defined by an axially moveable wall member, generally referred to as a nozzle ring. The position of the nozzle ring relative to a facing wall of the inlet passageway is adjustable to control the axial width of the inlet passageway. Thus, for example, as gas flowing through the turbine decreases the inlet passageway width may also be decreased to maintain gas velocity and optimise turbine output. Such nozzle rings essentially comprise a radially extending wall and inner and outer axially extending annular flanges. The annular flanges extend into an annular cavity defined in the turbine housing (a part of the housing which in practice be provided by the bearing housing) which accommodates axial movement of the nozzle ring.

The nozzle ring may be provided with vanes which extend into the inlet passageway and through slots provided on the facing wall of the inlet passageway to accommodate movement of the nozzle ring. Alternatively, vanes may extend from the fixed wall through slots provided in the nozzle ring. Generally the nozzle ring is supported on rods extending parallel to the axis of rotation of the turbine wheel and is moved by an actuator which axially displaces the rods. Various forms of actuator are known for use in variable geometry turbines, including pneumatic, hydraulic and electric actuators, mounted externally of the turbocharger and connected to the variable geometry system via appropriate linkages.

In addition to the conventional control of a variable geometry turbine to optimise turbocharger performance, it is also known to take advantage of the facility to minimise the turbocharger inlet to provide an exhaust braking function. Exhaust brake systems of various forms are widely fitted to vehicle engine systems, in particular to compression ignition engines (diesel engines) used to power large vehicles such as trucks. Conventional exhaust brake systems comprise a valve in the exhaust line from the engine which when activated substantially blocks the engine exhaust (fully blocking he exhaust line would stall the engine). This creates back pressure which retards rotation of the engine providing a braking force which is transmitted to the vehicle wheels through the vehicle drive train. The exhaust braking may be employed to enhance the effect of the conventional friction brakes acting on the vehicle wheels, or in some circumstances be used independently of the normal wheel braking system, for instance to control down hill speed of a vehicle. With some exhaust brake systems the brake is set to activate automatically when the engine throttle is closed (i.e. when the driver lifts his foot from the throttle pedal), and in others the exhaust brake may require manual activation by the driver, such as depression of a separate brake pedal. The exhaust brake valve is generally controllable to modulate the braking effect, for example to maintain a constant vehicle speed.

With a variable geometry turbine it is not necessary to provide a separate exhaust brake valve. Rather, the turbine inlet passageway may simply be closed to its minimum flow area when braking is required. The level of braking may be modulated by control of the inlet passageway size by appropriate control of the axial position of the nozzle ring (or other variable geometry mechanism). Whilst having the advantage of obviating the need to provide a separate exhaust brake valve, there are however problems associated with operation of variable geometry turbines in an exhaust braking mode.

In particular with the modem highly efficient turbines, a relatively high air flow is still delivered to the engine as the inlet passageway is reduced towards the minimum width. This can result in engine cylinder pressures approaching or exceeding acceptable limits if the inlet passage is closed too far. Accordingly there is a practical limit on the extent to which the inlet passage can be closed in braking mode, which in turn limits the effective braking force that can be provided by control of a conventional variable geometry turbine.

It is an object of the present invention to obviate or mitigate the above disadvantage.

According to the present invention there is provided a variable geometry turbine comprising a turbine wheel supported in a housing for rotation about a turbine axis, an annular inlet passage way extending radially inwards towards the turbine wheel, the annular inlet passageway being defined between a radial wall of a moveable wall member and a facing wall of the housing, the moveable wall member being mounted within an annular cavity provided within the housing and having inner and outer annular surfaces, the wall member being moveable axially between first and second positions to vary the width of the inlet passage way, the second axial position being closer to the said facing wall of the housing than the first axial position, the moveable wall member having a first annular flange extending axially from the radial wall into said cavity in a direction away from said facing wall of the housing, a first annular seal being disposed between said first annular flange and the adjacent inner or outer annular surface of the cavity, said first annular seal being mounted to one of said first annular flange or said adjacent annular surface of the cavity;

wherein one or more inlet bypass passages are provided in the other of said first annular flange and said adjacent cavity surface, such that said first annular seal and bypass passageways move axially relative to one another as the moveable wall member moves between said first and second positions; and wherein said first annular seal and the or each bypass passage are axially located such that with the annular wall member in said first position the seal prevents exhaust gas flow through the cavity but with said moveable wall member in the second position the or each bypass passage permits the flow of exhaust gas through said cavity to the turbine wheel thereby bypassing the annular inlet passageway.

Embodiments of the present invention will now be described, by way of example only, with reference to the accompanying drawings, in which.

Figure 4A:
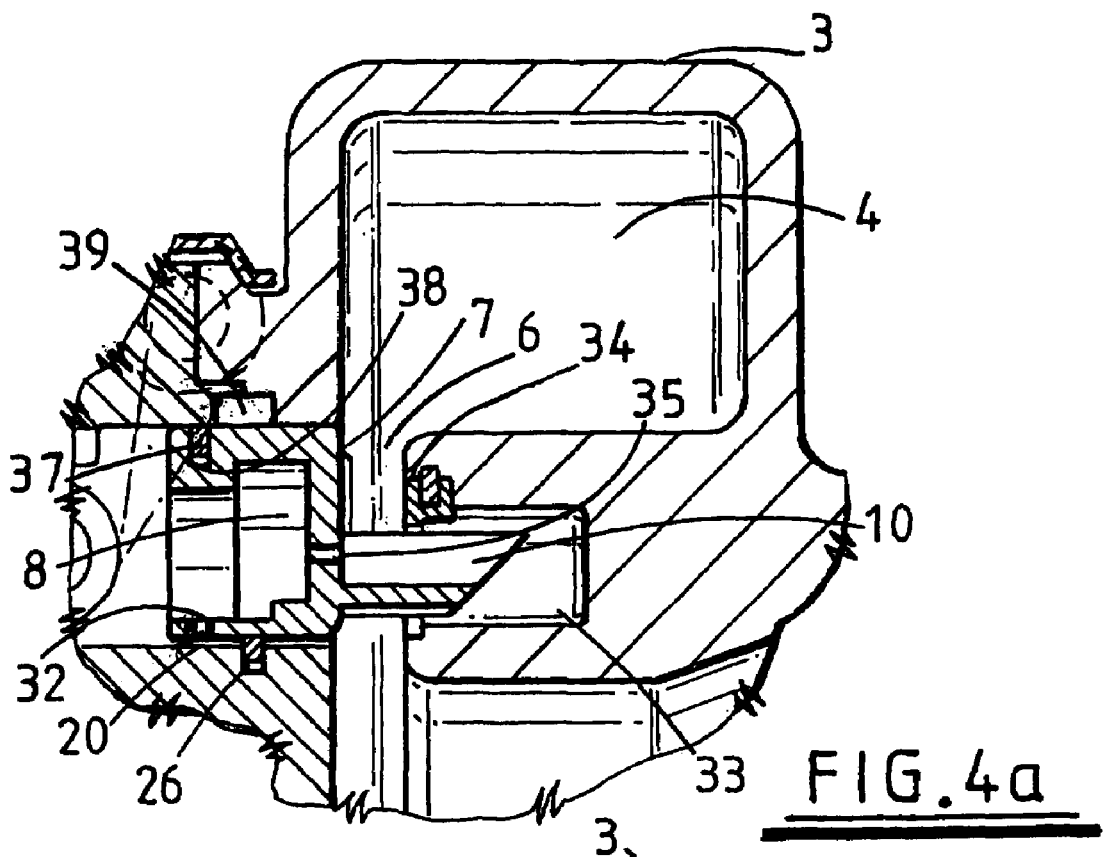
Figure 4B:
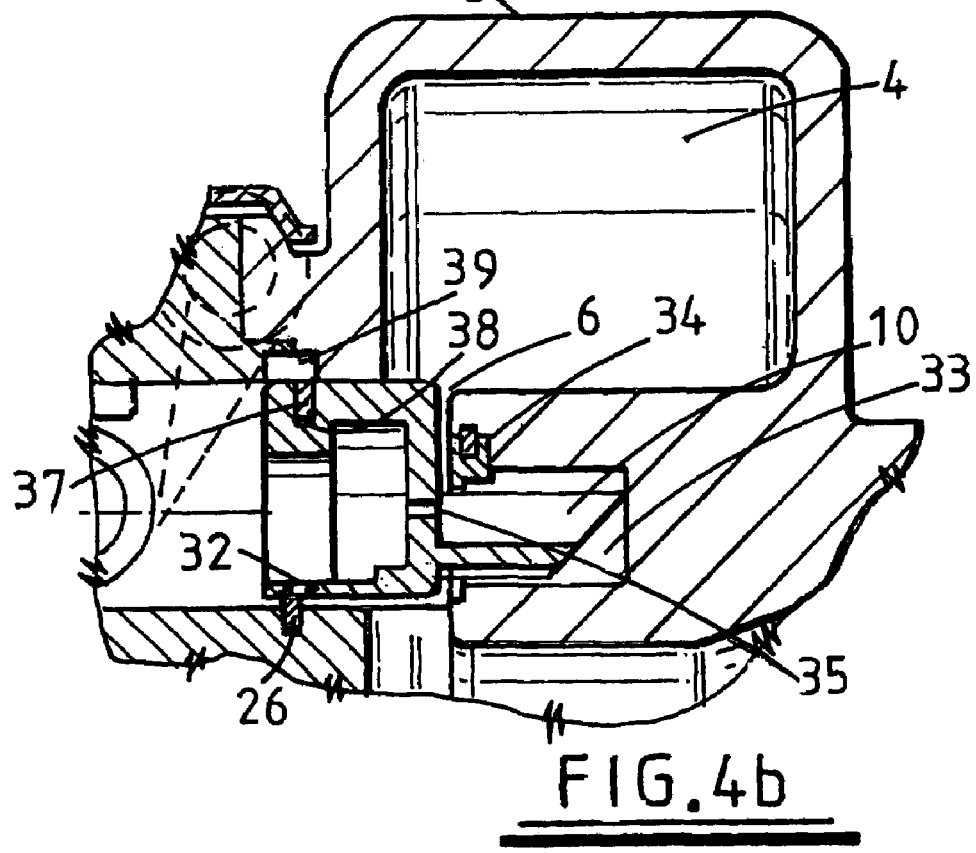

FIGS. 4a and 4b schematically illustrate a third embodiment of the present invention.

Figure 1:
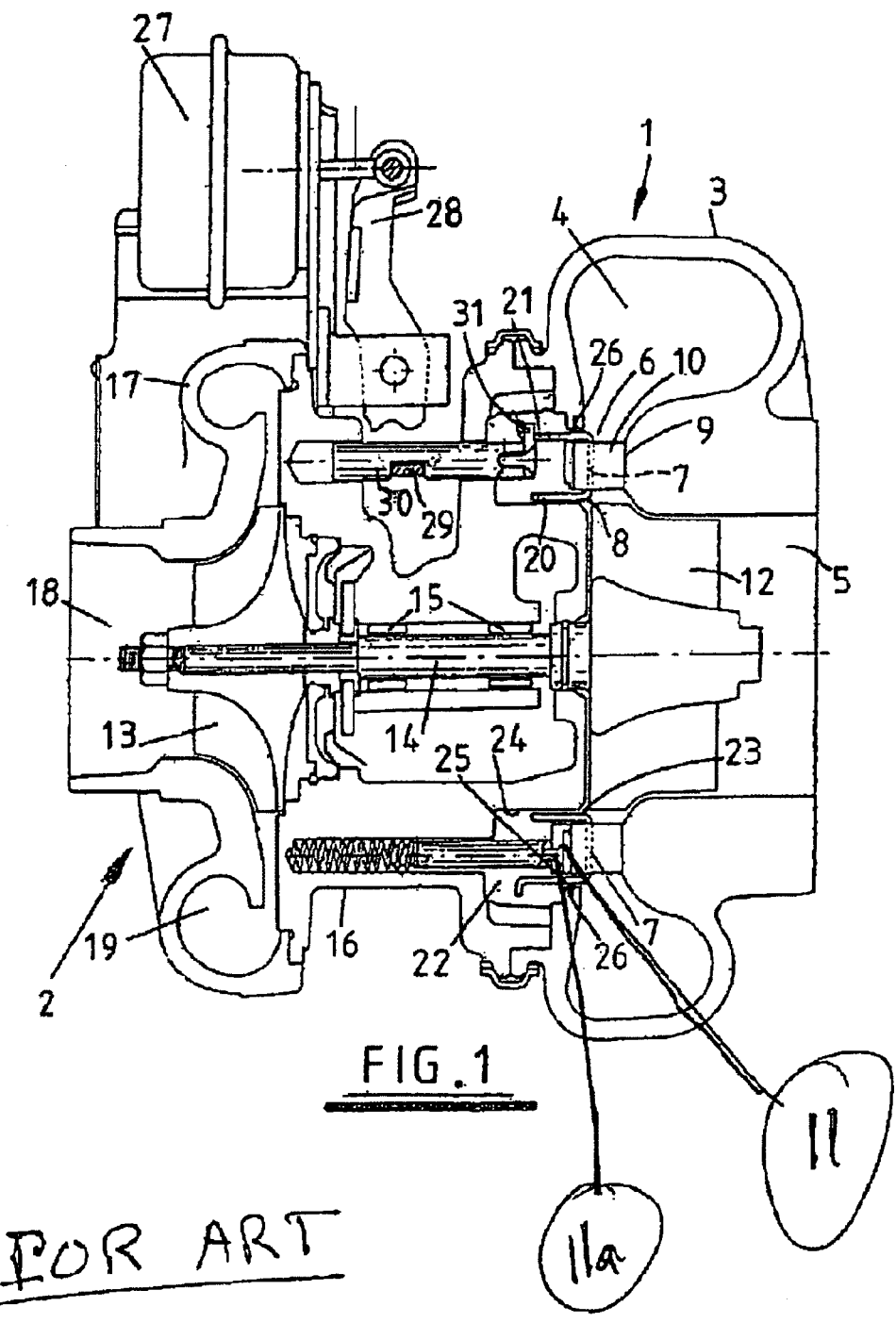
FIG. 1 is a cross-sectional illustration of a prior art turbocharger.

Referring to FIG. 1, this illustrates a known turbocharger as disclosed in U.S. Pat. No. 5,044,880. The turbocharger comprises a turbine stage 1 and a compressor stage 2. The turbine stage 1 is a variable geometry turbine comprising a turbine housing 3 defining a volute or inlet chamber 4 to which exhaust gas from an internal combustion engine (not shown) is delivered. The exhaust gas flows from the inlet chamber 4 to an outlet passageway 5 via an annular inlet passageway 6 defined on one side by a radial wall 7 of a moveable annular member 8, referred to herein as a nozzle ring, and on the other side by a facing radial wall 9 of the housing 3. An array of nozzle vanes 10 extend through slots in the nozzle ring 8 across the inlet passageway 6 from a vane support ring 11 which is mounted on support pins 12. The arrangement is such that the degree to which the vanes 10 extend across the inlet passageway 6 is controllable independently of the nozzle ring 8 and will not be described in detail here.

Gas flowing from the inlet chamber 4 to the outlet passageway 5 passes over a turbine wheel 12 which as a result drives a compressor wheel 13 via turbocharger shaft 14 which rotates on bearing assemblies 15 located within a bearing housing 16 which connects the turbine housing 2 to a compressor housing 17. Rotation of the compressor wheel 13 draws in air through a compressor inlet 18, and delivers compressed air to the intake of the engine (not shown) via an outlet volute 19. It will be appreciated that the bearing housing also houses oil supply and seal arrangements, the details of which are not necessary for an understanding of the present invention.

The nozzle ring 8 comprises a radially extending annular portion defining the radial wall 7, and axially extending inner and outer annular flanges 20 and 21 respectively which extend into an annular cavity 22 provided in the turbine housing 3. With the turbine construction shown in the figures, the majority of the cavity 22 is in fact defined by the bearing housing 16—this is purely a result of the construction of the particular turbocharger to which the invention is in this instance is applied and for the purposes of the present invention no distinction is made between the turbine housing and bearing housing in this regard. The cavity 22 has a radially extending annular opening 23 defined between radially inner and outer annular surfaces 24 and 25. A seal ring 26 is located in an annular groove provided in outer annular surface 25 and bears against the outer annular flange 21 of the nozzle ring 8 to prevent exhaust gas flowing through the turbine via the cavity 22 rather than the inlet passageway 6.

A pneumatically operated actuator 27 is operable to control the position of the nozzle ring 8 via an actuator output shaft 28 which is linked to a stirrup member 29 which in turn engages axially extending guide rods 30 (only one of which is visible in the figures) which support the nozzle ring 8 via linking plates 31. Accordingly, by appropriate control of the actuator 27 the axial position of the guide rods and thus of the nozzle ring 8 can be controlled. FIG. 1 shows the nozzle ring 8 in its fully open position in which the inlet passageway 6 is at its maximum width.

As mentioned above, a variable geometry turbine such as that disclosed in FIG. 1 can be operated to function as an exhaust brake by closing the inlet passageway 6 to a minimum width when braking force is required. However, also as mentioned above, with such an arrangement the minimum width of the inlet passageway under exhaust braking conditions is limited by the need to avoid unacceptably high engine cylinder pressures.

Figure 2A:
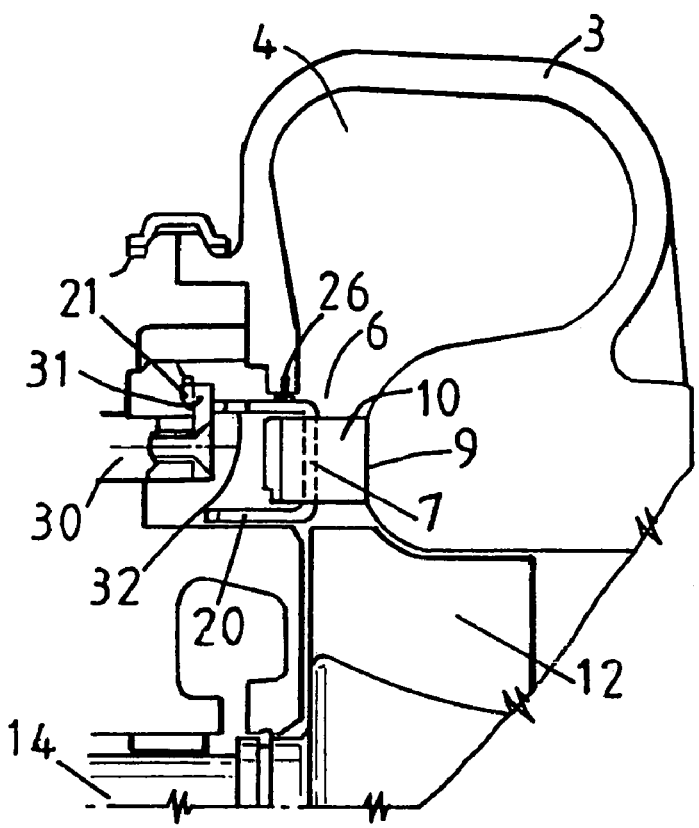
FIGS. 2a and 2b illustrate a modification of the turbocharger of FIG. 1 in accordance with the present invention.
Figure 2B:
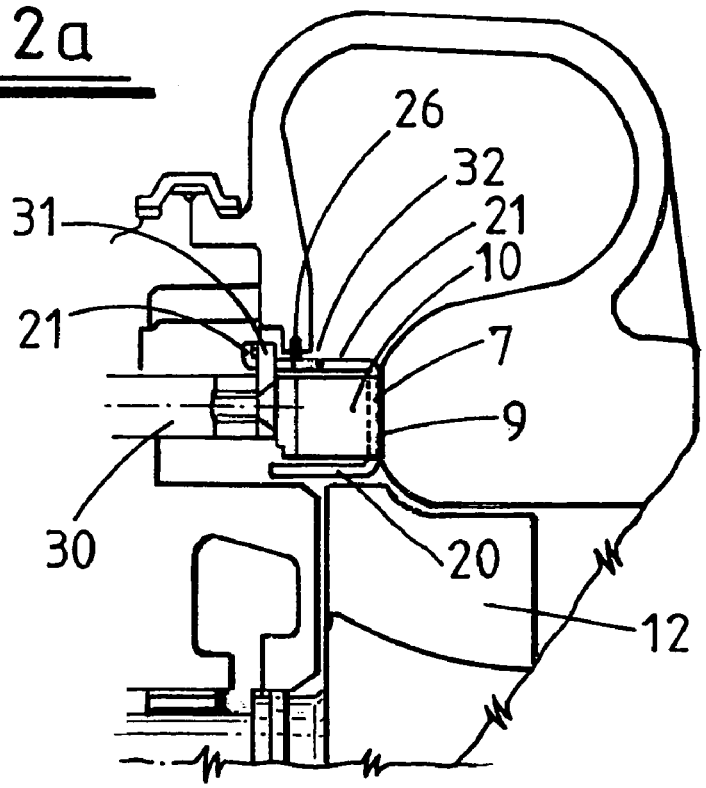

FIGS. 2a and 2b illustrate a modification of the turbocharger of FIG. 1 in accordance with the present invention. Only those parts of the turbine which need to be described for an understanding of the invention are shown in FIGS. 2a and 2b which are enlargements of the nozzle ring/inlet passageway region of the turbocharger showing the nozzle ring in fully open and fully closed positions respectively. The nozzle ring 8 is modified by the provision of a circumferential array of apertures 32 provided through the radially outer flange 21. The positioning of the apertures 32 is such that they lie on the side of the seal ring 26 remote from the inlet passageway 6 (as shown in FIG. 2a) except when the nozzle ring 6 approaches the closed position, at which point the apertures 32 pass the seal 26 (as shown in FIG. 2b). This opens bypass flow path allowing some exhaust gas to flow from the inlet chamber 4 to the turbine wheel 12 via the cavity 22 rather than through the inlet passageway 6. The exhaust gas flow that bypasses the inlet passageway 6, and nozzle vanes 10, will do less work than the exhaust gas flow through the inlet passageway 6 particularly since this is turned in a tangential direction by the vanes 10. In other words, as soon as the apertures 32 are brought into communication with the inlet passageway 6 there is an immediate reduction in the efficiency of the turbocharger and corresponding drop in compressor outflow pressure (boost pressure) with an accompanying drop in engine cylinder pressure.

Thus, with the present invention the provision of the inlet bypass apertures 32 will have no effect on the efficiency of the turbocharger under normal operating conditions but when the turbine is operated in an engine braking mode, and the inlet passageway is reduced to its minimum, the apertures will 32 facilitate a greater reduction in inlet passageway size than is possible with the prior art without over pressurising the engine cylinders. This thereby provides improved engine braking performance.

It will be appreciated that the efficiency reducing effect on the turbocharger can be predetermined by appropriate selection of the number, size, shape and position of the apertures 32.

Figure 3B:
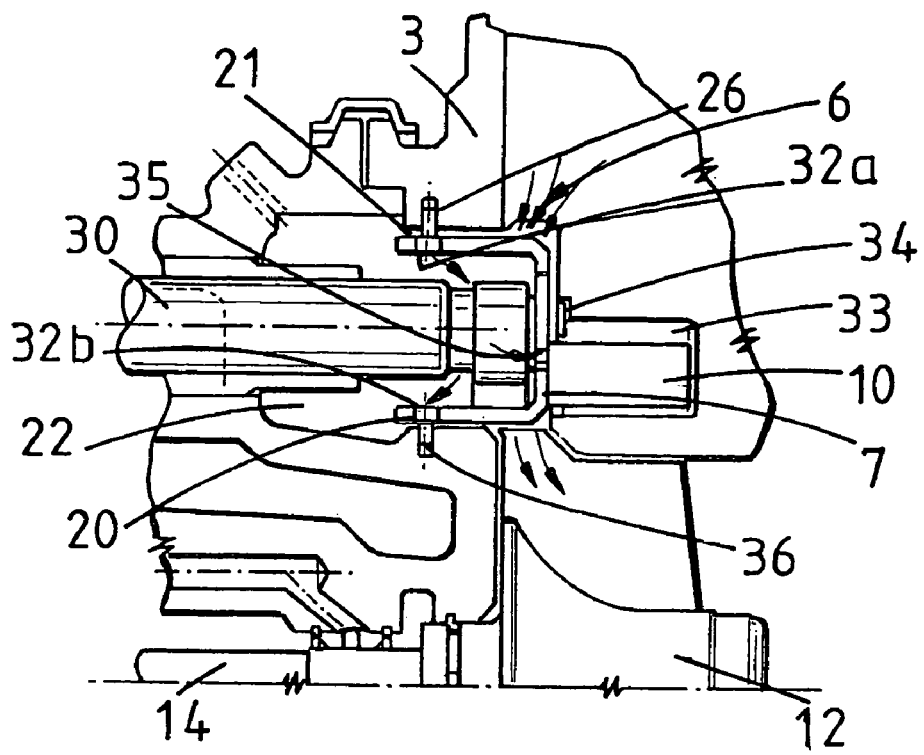
FIGS. 3a and 3b illustrate a second embodiment of the present invention.
Figure 3A:
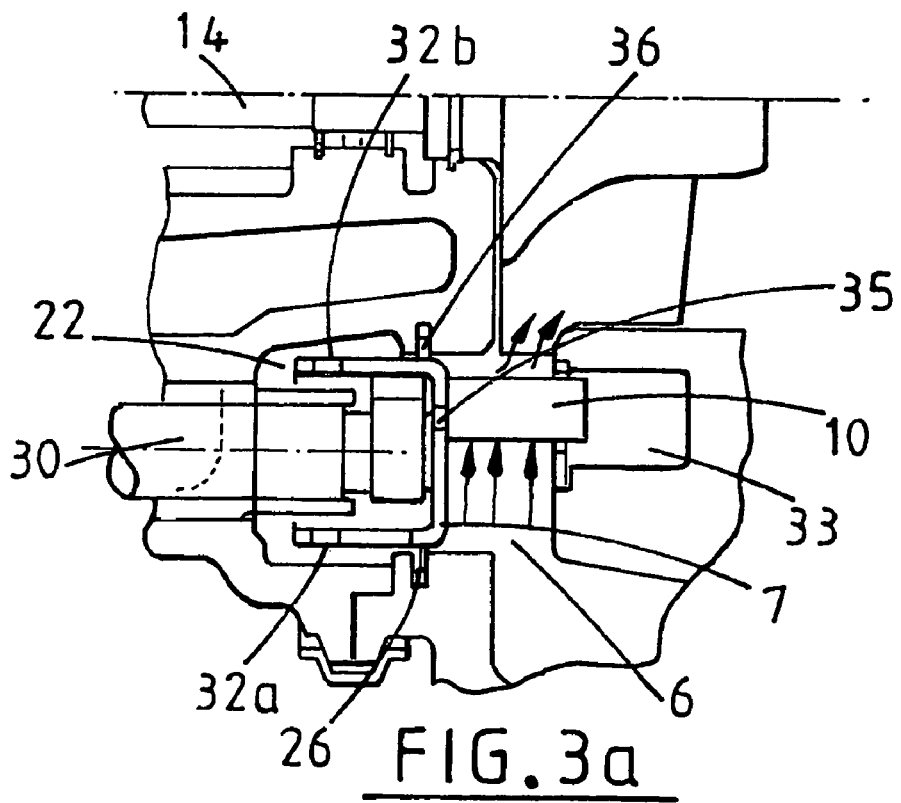

FIGS. 3a and 3b illustrate a second embodiment of the present invention. As with FIGS. 2a and 2b, only detail of the nozzle ring/inlet passageway region of the turbine is illustrated. Where appropriate, the same reference numerals are used in FIGS. 3a and 3b as used in FIGS. 1 and 2. FIGS. 3a and 3b illustrate application of the invention to an otherwise conventional turbine which differs from the turbine of FIG. 1 in several respects. Firstly, the nozzle vanes 10 are mounted on the nozzle ring 8 and extend across the inlet passageway 6 and into a cavity 33 via respective slots provided in a shroud plate 34 which together with the radial wall 7 of the nozzle ring 8 defines the width of the inlet passageway 6. This is a well known arrangement.

Secondly, in accordance with the teaching of European patent number 0 654 587, pressure balancing apertures 35 are provided through the radial wall 7 of the nozzle ring 8 and the inner annular flange 20 is sealed with respect to the housing 3 by a respective seal ring 36 located in an annular groove provided in the radially inner annular portion 24 of the housing 3. The provision of the apertures 35 ensures that pressure within the cavity 22 is equal to the static pressure applied to the radial face 7 of the nozzle ring 8 by exhaust gas flow through the inlet passageway 6. This reduces the load on the nozzle ring with an increase in the accuracy of control of the position of the nozzle ring 8, particularly as the inlet passageway 6 is reduced towards its minimum width.

In view of the provision of a radially inner seal ring 36, application of the present invention requires provision of gas bypass passages 32a in the inner annular flange 20 of the nozzle ring 8. The passages 32a are positioned relative to the seal ring 26 so that they open into communication with the inlet passageway side of the seal ring 26 at the same time as passages 32b in outer annular flange 21 thereby providing a bypass flow passage through the cavity 22 achieving exactly the same effect as described above in relation to the embodiment of FIGS. 2a and 2b.

Alternatively the outer passages 32b can be omitted, relying on the pressure balancing apertures 35 to provide a bypass flow path in conjunction with inner passages 32a.

It is also known to seal the nozzle ring with respect to the housing by locating inner and/or outer seal rings within locating grooves provided on the nozzle ring rather than locating grooves provided within the housing. In this case the seal ring(s) will move with the nozzle ring. Specifically, FIGS. 4a and 4b illustrate the nozzle ring/inlet passageway region of the turbine disclosed in European patent number 0 654 587 (mentioned above) modified in accordance with the present invention. Where appropriate, the same reference numerals are used in FIGS. 4a and 4b as are used above. As with the turbine arrangement of FIGS. 3a and 3b, the nozzle vanes 10 are supported by the nozzle ring 8 and extend across the inlet passageway 6, through a shroud plate 34 and into a cavity 33. Pressure balancing apertures 35 are provided through the radial wall 7 of the nozzle ring 8, which is sealed with respect to the cavity 22 by inner and outer ring seals 26 and 37. However, whereas the seal ring 26 is located within a groove provided in the housing 3, the radially outer seal ring 37 is located within a groove 38 provided within the outer annular flange 21 of the nozzle ring 8 and thus moves as the nozzle ring moves. In accordance with the present invention the inner annular flange 20 of the nozzle ring 8 is provided with inlet bypass apertures 32 which pass the seal ring 26 as the nozzle ring moves to close the inlet passageway 6 to a minimum (as illustrated in FIG. 4b). However, the outer inlet bypass path is provided not by apertures through the nozzle ring, but by a circumferential array of recesses 39 formed in the outer annular portion 25 of the opening 23 of cavity 22. As can be seen from FIG. 4a, under normal operating conditions the seal ring 37 will be disposed inward of the recesses 39 preventing the passage of exhaust gas around the nozzle ring 8 and through the cavity 22. However, as the nozzle ring moves to close the inlet passageway 6 to a minimum, as shown in FIG. 4b, the seal ring 37 moves into axial alignment with the recesses 39 which thereby provide a bypass path around the seal ring 37 to allow gas to flow through the cavity 22, and to the turbine wheel via the inlet bypass apertures 32 provided in the inner annular flange of the nozzle ring 8. It will be appreciated that the effect of the recesses 39 is directly equivalent to the effect of apertures 32 and that in operation this embodiment of the invention will function in substantially the same way as the other embodiments of the invention described above.

It will be appreciated that modifications may be made to the embodiments of the invention described above. For instance, if only one seal ring is required as for example in embodiment of FIG. 8, and this is located on the nozzle ring, then there will be no need to provide aperture 32 in the inner flange of the nozzle ring. Similarly, if there are both inner and outer seal rings located in the housing, it will be necessary to provide bypass recesses in both the inner and outer annular portions of the housing instead of bypass apertures through the nozzle ring.

Other possible modifications and applications of the present invention will be readily apparent to the appropriately skilled person.

The invention claimed is:

1. An apparatus comprising:
a turbocharger turbine;
an exhaust inlet passageway leading to the turbocharger turbine; and
a nozzle ring moveable between a first position in which the exhaust inlet passageway has a maximum geometry and a second position in which the exhaust inlet passageway has a minimum geometry; and
wherein the nozzle ring in the second position provides an exhaust bypass flow path leading to the turbocharger turbine.

2. An apparatus according to claim 1 wherein the exhaust bypass flow path includes an aperture defined in the nozzle ring.

3. An apparatus according to claim 1 wherein the exhaust bypass flow path includes a first aperture defined in the nozzle ring and a second aperture defined in the nozzle ring.

4. An apparatus according to claim 1 wherein the nozzle ring includes a radially outer flange and the exhaust bypass flow path includes a plurality of apertures provided through the radially outer flange.

5. An apparatus according to claim 1 wherein the exhaust bypass flow path includes an aperture defined in a radial wall of the nozzle ring.

6. An apparatus according to claim 1 wherein the nozzle ring includes a radially inner flange and the exhaust bypass flow path includes a plurality of apertures formed in the radially inner flange.

7. An apparatus according to claim 1 wherein the exhaust inlet passageway is fully open in the first position and the exhaust inlet passageway is fully closed in the second position.

8. An apparatus according to claim 1 wherein the nozzle ring provides an exhaust bypass flow path in the second position by positioning a seal in alignment with a recess.

9. An apparatus according to claim 1 further comprising a turbocharger including the turbocharger turbine.

10. An apparatus according to claim 9 further comprising a turbocharged internal combustion engine including the turbocharger.

11. A variable geometry turbine comprising:
an inlet flow passageway leading to the turbine;
a moveable member bordering the inlet flow passageway, the moveable member being moveable to vary the width of the inlet flow passageway; and
a bypass passageway formed in the moveable member; wherein
the moveable member is moveable to a first position substantially precluding exhaust flow through the bypass passageway and a second position permitting exhaust flow through the bypass passageway.

12. A variable geometry turbine according to claim 11 wherein the moveable member includes a radially outer flange and the bypass passageway includes a plurality of apertures provided in the radially outer flange.

13. A variable geometry turbine according to claim 11 wherein the moveable member includes a radially inner flange and the bypass passageway includes a plurality of apertures provided in the radially inner flange.

14. A variable geometry turbine according to claim 11 wherein the moveable member includes a plurality of vanes, the vanes extending into the inlet flow passageway when the moveable member is positioned in the first position.

15. A variable geometry turbine according to claim 11 wherein the moveable member substantially precludes flow through inlet flow passageway when the moveable member is positioned in the second position.

16. An apparatus comprising:
a turbocharger including a turbine and a turbine nozzle ring, the turbine nozzle ring including a radially outer surface, a radially extending surface, a radially inner surface, and an aperture in the radially outer surface, the aperture providing at least a portion of an exhaust bypass flowpath through the nozzle ring leading to the turbine.

17. An apparatus according to claim 16 further comprising a second aperture provided in the radially inner surface of the nozzle ring, the second aperture providing at least a portion of the exhaust bypass flowpath through the nozzle ring leading to the turbine.

18. An apparatus according to claim 11 further comprising a circumferential array of apertures in the radially outer surface, the circumferential array of apertures providing at least a portion of the exhaust bypass flowpath through the nozzle ring leading to the turbine.

19. An apparatus according to claim 11 further comprising a turbocharged internal combustion engine including the turbocharger.

20. An apparatus according to claim 11 wherein the radially outer surface is a flange surface and the radially inner surface is a flange surface.

21. An apparatus according to claim 11 wherein the flowpath through the nozzle ring includes the aperture in the radially outer surface and an aperture in the radially extending surface.

* * * * *